(12) United States Patent
Peng et al.

(10) Patent No.: US 10,564,833 B2
(45) Date of Patent: Feb. 18, 2020

(54) METHOD AND APPARATUS FOR CONTROLLING DEVICES

(71) Applicant: Beijing Xiaomi Mobile Software Co., Ltd., Haidian District, Beijing (CN)

(72) Inventors: Tao Peng, Beijing (CN); Yangpeng Lv, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 331 days.

(21) Appl. No.: 15/360,367

(22) Filed: Nov. 23, 2016

(65) Prior Publication Data

US 2017/0322712 A1 Nov. 9, 2017

(30) Foreign Application Priority Data

May 9, 2016 (CN) .......................... 2016 1 0302803

(51) Int. Cl.
*G06F 3/0484* (2013.01)
*H04L 12/28* (2006.01)
(Continued)

(52) U.S. Cl.
CPC ....... *G06F 3/04847* (2013.01); *G05B 19/042* (2013.01); *G06F 3/041* (2013.01); *G06F 3/0482* (2013.01); *G06F 3/04817* (2013.01); *G06F 3/04845* (2013.01); *G06F 3/04883* (2013.01); *G06F 21/604* (2013.01); *G08C 17/00* (2013.01); *G08C 17/02* (2013.01);
(Continued)

(58) Field of Classification Search
CPC ....... G06F 3/0481; G05B 13/02; G05B 15/00; G01L 5/22; G08C 17/02
See application file for complete search history.

(56) References Cited

U.S. PATENT DOCUMENTS

2008/0180228 A1\* 7/2008 Wakefield ............. G01S 5/0252
340/4.62
2014/0055251 A1\* 2/2014 Son ........................ G08O 17/02
340/12.54
(Continued)

FOREIGN PATENT DOCUMENTS

CN 103369385 A 10/2013
CN 103472990 A 12/2013
(Continued)

OTHER PUBLICATIONS

Extended European Search Report issued in corresponding EP Application No. 16197587, dated May 26, 2017, 8 pages.
(Continued)

*Primary Examiner* — Rashawn N Tillery
(74) *Attorney, Agent, or Firm* — Arch & Lake LLP

(57) ABSTRACT

Methods and apparatuses are provided for controlling a device. In the method, the electronic device displays a control widget corresponding to the at least one device in a lock screen. When a trigger operation on the control widget is detected, the electronic device determines a control instruction corresponding to the control widget. The electronic device sends the control instruction to the at least one device, in which the control instruction is configured to instruct the at least one device to execute a predetermined operation corresponding to the control instruction.

12 Claims, 10 Drawing Sheets

(51) Int. Cl.

| | | |
|---|---|---|
| *H04M 1/725* | (2006.01) | |
| *G08C 17/02* | (2006.01) | |
| *H04L 12/46* | (2006.01) | |
| *G08C 17/00* | (2006.01) | |
| *G05B 19/042* | (2006.01) | |
| *G06F 3/041* | (2006.01) | |
| *G06F 3/0481* | (2013.01) | |
| *G06F 3/0482* | (2013.01) | |
| *G06F 3/0488* | (2013.01) | |
| *G06F 21/60* | (2013.01) | |

(52) U.S. Cl.
CPC ...... *H04L 12/2803* (2013.01); *H04L 12/4625* (2013.01); *H04M 1/72533* (2013.01); *G05B 2219/13144* (2013.01); *G08C 2201/93* (2013.01); *H04M 2250/74* (2013.01)

(56) References Cited

U.S. PATENT DOCUMENTS

| | | | | |
|---|---|---|---|---|
| 2014/0156281 A1* | 6/2014 | Boyd | .................... | H04L 12/281 704/275 |
| 2014/0176309 A1* | 6/2014 | Wang | ............... | H04N 21/42222 340/12.5 |
| 2014/0380183 A1* | 12/2014 | Esaka | ................... | G06F 3/0481 715/740 |
| 2015/0087258 A1* | 3/2015 | Barnes | .................... | H04W 4/90 455/404.2 |
| 2017/0004828 A1* | 1/2017 | Lee | ....................... | G10L 13/033 |

FOREIGN PATENT DOCUMENTS

| | | |
|---|---|---|
| CN | 104330974 A | 2/2015 |
| CN | 104754122 A | 7/2015 |
| CN | 105302412 A | 2/2016 |
| EP | 2145326 A1 | 1/2010 |
| JP | 2014042282 A | 3/2014 |
| JP | 2014123878 A | 7/2014 |
| JP | 2014230061 A | 12/2014 |
| KR | 20140029609 A | 3/2014 |
| WO | 2015088141 A1 | 6/2015 |

OTHER PUBLICATIONS

Japanese Office Action (including English translation) issued in corresponding JP Application No. 2017517673, dated Aug. 10, 2018, 6 pages.

Chinese Office Action (including English translation) issued in corresponding CN Application No. 201610302803.1, dated Mar. 19, 2018, 12 pages.

International Search Report (including English translation) issued in International Application No. PCT/CN2016/09286, dated Feb. 14, 2017, 13 pages.

Japanese Office Action (including English translation) issued in corresponding JP Application No. 2017517673, dated Nov. 2, 2018, 7 pages.

Korean Office Action (including English translation) issued in KR10-2018-7004963, dated Mar. 22, 2019, 7 pages.

First Office Action issued in corresponding Chinese Patent Application No. 201610302803.1, dated Aug. 16, 2017, 7 pages.

* cited by examiner

METHOD AND APPARATUS FOR CONTROLLING DEVICES

CROSS-REFERENCE TO RELATED APPLICATION

This application is based on and claims priority to Chinese Patent Application Serial No. CN 201610302803.1, filed with the State Intellectual Property Office of P. R. China on May 9, 2016, the entire content of which is incorporated herein by reference.

FIELD

The present disclosure relates to a control technology field, and more particularly to a method and an apparatus for controlling a device.

BACKGROUND

In daily life, the mobile phone may be used as a main control device of some electronic devices, to control the electronic devices to perform related operations, for example, to control a TV to change channel or volume.

In the related art, when the mobile phone is in the lock screen state, the user needs to unlock the screen of the mobile phone if he wants to control other electronic devices to perform related operations via the mobile phone, and then open the application (APP) having the capability of controlling electronic devices in the mobile phone with unlocked screen, and control the electronic devices to execute related operations by using related control functions in the APP.

SUMMARY

Embodiments of the present disclosure provide a method and an apparatus for controlling a device. The technical solutions are as follows.

According to a first aspect of the present disclosure, a method for controlling a device is provided, and the method includes: displaying a control widget corresponding to at least one device in a lock screen; determining a control instruction corresponding to the control widget, when a trigger operation on the control widget is detected; and sending the control instruction to the at least one device, in which the control instruction is configured to instruct the at least one device to execute a predetermined operation corresponding to the control instruction.

According to a second aspect of the present disclosure, an apparatus for controlling a device is provided, and the apparatus includes: a control widget display module, configured to display a control widget corresponding to at least one device in a lock screen; an instruction determining module, configured to determine a control instruction corresponding to the control widget, when a trigger operation on the control widget is detected; and a sending module, configured to send the control instruction to the at least one device, in which the control instruction is configured to instruct the at least one device to execute a predetermined operation corresponding to the control instruction.

According to a third aspect of the present disclosure, an apparatus for controlling a device is provided. The apparatus includes: a processor and a memory configured to store instructions executable by the processor. The processor is configured to: display a control widget corresponding to at least one device in a lock screen; determine a control instruction corresponding to the control widget, when a trigger operation on the control widget is detected; and send the control instruction to the at least one device, in which the control instruction is configured to instruct the at least one device to execute a predetermined operation corresponding to the control instruction.

According to a fourth aspect of the present disclosure, a non-transitory computer readable storage medium is provided. The, non-transitory computer readable storage medium stores instructions that, when executed by an electronic device including a processor and a touch screen, causing the electronic device to execute following acts including: displaying a control widget corresponding to at least one device in a lock screen; determining a control instruction corresponding to the control widget, when a trigger operation on the control widget is detected; and sending the control instruction to the at least one device, wherein the control instruction is configured to instruct the at least one device to execute a predetermined operation corresponding to the control instruction.

It should be understood that, the general description above and the following detailed description are merely exemplary and illustrative, and cannot be construed to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
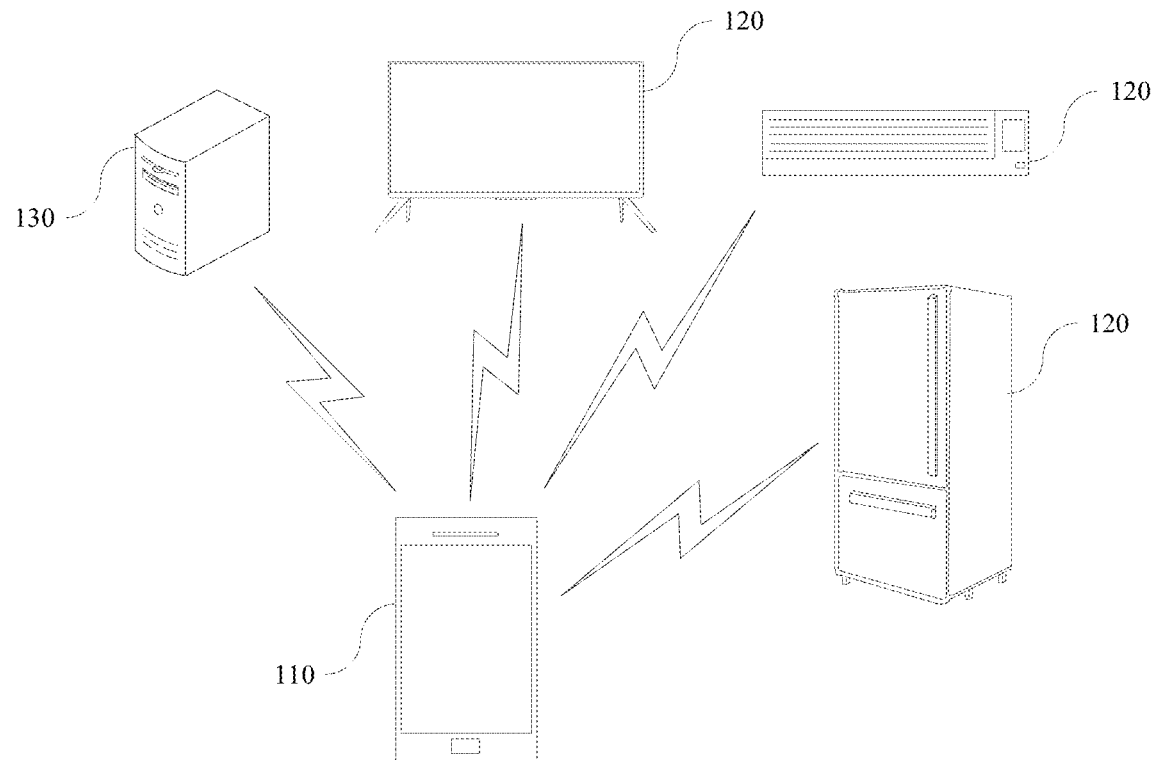
FIG. 1 is a schematic diagram showing an implementation environment in which a method for controlling a device according to the present disclosure is applied.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only configured to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

In order to make objectives, technical solutions and advantages of the present disclosure clearer, exemplary embodiments will be described in detail herein with reference to accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of methods and devices consistent with some aspects of the present disclosure detailed in the appended claims.

The technical solutions provided in the present disclosure may have the following beneficial effects. With embodiments of the present disclosure, the control widget corresponding to the at least one device is displayed in the lock screen. When the trigger operation on the control widget is detected, the control instruction corresponding to the control widget is determined and sent to the at least one device. The control instruction may be configured to instruct the at least one device to execute the predetermined operation corresponding to the control instruction. In this way, the user may control the at least one device to execute related operations rapidly via the control widget on the lock screen of a main control device, without unlocking the main control device and without entering into an application for controlling devices, thus simplifying the operation steps of controlling the at least one device via the main control device with locked screen.

FIG. 1 is a schematic diagram of an implementation environment in which a method for controlling a device according to the present disclosure is applied. The implementation environment may include a main control device 110, a device 120, and a cloud server 130.

The main control device 110 is configured to send a control instruction to the at least one device 120. The main control device 110 is connected with the at least one device 120 via a wireless network. The wireless network may be a 2G, 3G or 4G network, or may be a wireless local network. Moreover, the main control device 110 may be connected with the at least one device 120 via IrDA technology, UWB technology, BlueTooth technology, or other technology.

The main control device 110 may be provided with a touch screen configured to display information and receive a touch operation from a user. The main control device 110 may be a terminal having a lock screen state, for example, a mobile phone, a tablet PC, a wearable device, a MP3 player, a MP4 player, or other electronic device. When the touch screen of the main control device 110 is in the lock screen state, the user may only use limited functions of the main control device. For example, the user may not be able to make non-urgent phone calls or browsing Internet when the screen is locked.

The at least one device 120 is configured to receive the control instruction sent by the main control device, and to perform work indicated by the control instruction. The at least one device 120 may be a smart device or a device which may constitute a smart scene, for example, an air conditioner (AC), a TV, a heater, an air cleaner, a water purifier, a lamp, a camera, a power switch, an infrared sensor, and a smart socket.

Alternatively, the implementation environment may further include the cloud server 130. The cloud server 130 is connected with the main control device 110 via the wireless network. The cloud server 130 may provide speech recognition services, and return the control instruction recognized to the main control device 110.

In the following, taking the implementation environment shown in FIG. 1 as an example, technical solutions provided by respective embodiments of the present disclosure will be explained and illustrated.

Figure 2:
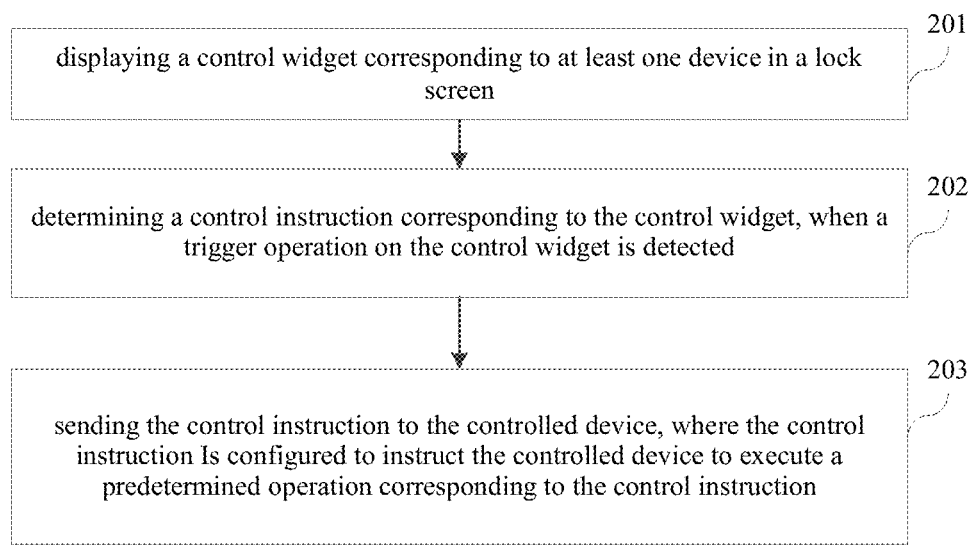
FIG. 2 is a flow chart of a method for controlling a device according to an exemplary embodiment.

FIG. 2 is a flow chart of a method for controlling a device according to an exemplary embodiment. The method may be executed by the main control device 110 in the implementation environment shown in FIG. 1, and the method may include following steps.

In step 201, a control widget corresponding to the at least one device is displayed in a lock screen.

In step 202, when a trigger operation on the control widget is detected, the control instruction corresponding to the control widget is determined.

In step 203, the control instruction is sent to the at least one device, in which the control instruction is configured to instruct the at least one device to execute a predetermined operation corresponding to the control instruction.

In conclusion, with the method for controlling a device provided by embodiments of the present disclosure, the control widget corresponding to the at least one device is displayed in the lock screen. When the trigger operation on the control widget is detected, the control instruction corresponding to the control widget is determined and sent to the at least one device. The control instruction is configured to instruct the at least one device to execute the predetermined operation corresponding to the control instruction. In this way, the user may control the at least one device to execute related operations rapidly via the control widget on the lock screen of a main control device, without unlocking the main control device and without entering into an application for controlling devices, thus simplifying the operation steps of controlling the at least one device via the main control device with locked screen.

Figure 3:
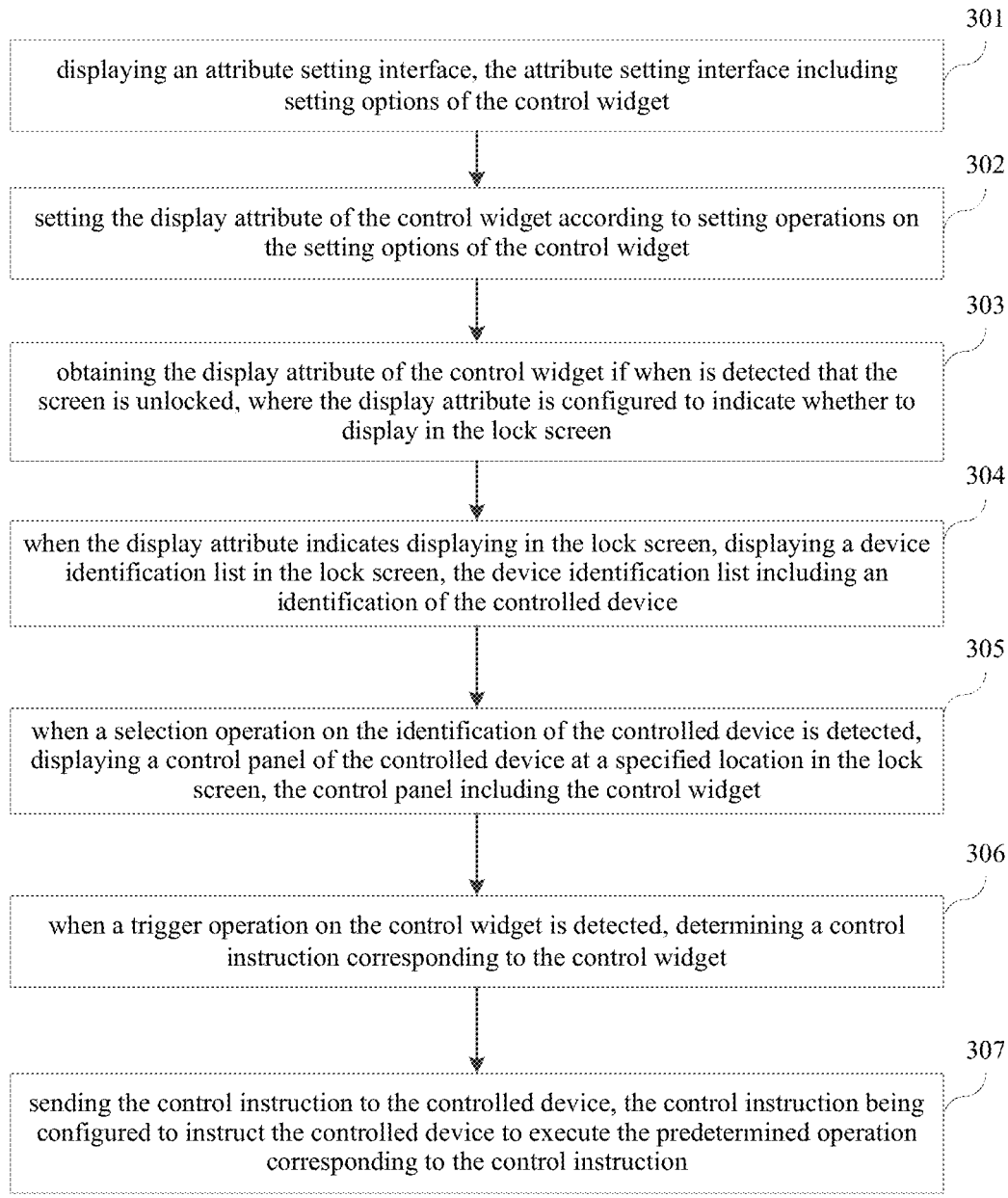
FIG. 3 is a flow chart of a method for controlling a device according to another exemplary embodiment.

FIG. 3 is a flow chart of a method for controlling a device according to another exemplary embodiment. The method may be executed by the main control device 110 in the implementation environment shown in FIG. 1, and may include following steps.

In step 301, an attribute setting interface is displayed, in which the attribute setting interface includes setting options of the control widget.

The setting options may include display attribute setting options, and the user may pre-set whether to display the control widget corresponding to the at least one device via the attribute setting option of the at least one device and pre-set displaying which control widgets corresponding to the at least one device. Alternatively, the setting options may further include a brightness attribute setting option and a color attribute setting option for setting the brightness and color of the control widget displayed in the lock screen.

Figure 4:
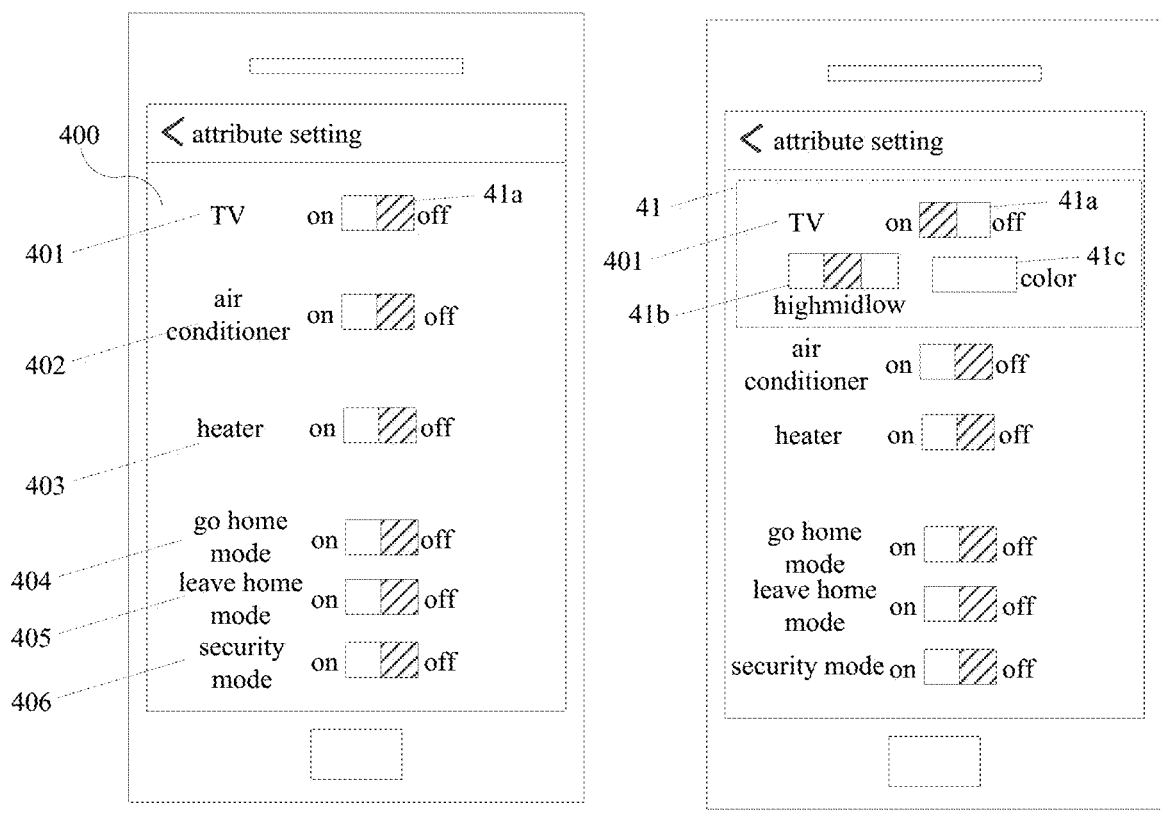
FIG. 4 is a schematic interface diagram of an attribute setting interface based on an embodiment shown in FIG. 3.

For example, reference may be made to FIG. 4, which is a schematic interface diagram of an attribute setting interface based on the embodiment shown in FIG. 3. For the setting item 401, the setting item 402, and the setting item 403 shown in the attribute setting interface 400, each setting item may be configured to display the setting option of one first control widget, and each first control widget may correspond to one at least one device. For the setting item 404, the setting item 405, and the setting item 406, each setting item is configured to display the setting option of one second control widget, and each second control widget is corresponding to one smart scene, in which when one smart scene is started and the working condition of a certain at least one device changes, other at least one devices related with the at least one device perform the predetermined operation.

In FIG. 4, the setting item corresponding to each control widget has an attribute setting region. Taking the setting item 401 as an example, the attribute setting region corresponding to the setting item 401 is the attribute setting region 41. In the attribute setting region 41, attributes which can be set may include a display attribute setting option 41*a*, a brightness attribute setting option 41*b* and a color attribute setting option 41*c*. The display attribute is the primary attribute of the setting item 401. When the display attribute of the setting item 401 is set as starting, the brightness attribute setting option 41*b* and the color attribute setting option 41*c* are displayed in the attribute setting region 41. When the display attribute of the setting item 401 is set as hiding, the brightness attribute setting option 41*b* and the color attribute setting option 41*c* are not displayed in the attribute setting region 41. The brightness attribute setting option 41*b* is configured to indicate the brightness of the whole display screen when the control widget is displayed in the lock screen, and the color attribute setting option 41*c* is configured to indicate the colors of the control widget in the selected state and in the unselected state when the control widget is displayed in the lock screen. For example, the button indicating whether the TV (at least one device) is turned on or off is orange in the starting state and is grey white in the closing state. The color attribute setting option 41*c* may be displayed as an input box.

Alternatively or additionally, besides the attributes 41*a*, 41*b* and 41*c*, the setting options of the setting item corresponding to the control widget may further include an animation display attribute setting option, a period display attribute setting option and a smart display attribute setting option.

The animation display attribute setting option may include various animation forms of displaying the control widget, for example, blinking, rotation, overturn and beating. The animation form is configured to indicate whether words displayed on the control widget in the lock screen is displayed according to the predetermined animation display form. For example, the word "air conditioner" on the first control widget is displayed in the animation form of blinking. The period display attribute setting option is configured to set the time period during which the control widget is displayed in the lock screen when the display attribute of the control widget is set as "starting". For example, the control widget "air conditioner" is set to be displayed during 7:00~8:30 and 16:00~20:00. The smart display attribute setting option includes two states of starting and closing, and is configured such that the control widget is displayed in the lock screen or not displayed in the lock screen according to how far the distance between the main control device and the at least one device is. For example, the first control widget "TV" is not displayed when the distance between the main control device and the at least one device "TV" is greater than a predetermined threshold, and is displayed when the distance is less than the predetermined threshold.

In step 302, the display attribute of the control widget is set according to setting operations on the setting options of the control widget.

Taking the attribute setting interface shown in FIG. 4 as an example, in this step, the display attribute of the control widget may be set according to the setting operations on the display attribute setting option, the brightness attribute setting option and the color attribute setting option of the control widget, or according to the setting operations on the animation display attribute setting option, the period display attribute setting option, and the smart display attribute setting option of the control widget.

In step 303, when the screen is unlocked, the display attribute of the control widget is obtained, in which the display attribute is configured to indicate whether to display in the lock screen.

The display attribute of the control widget includes two states of starting and hiding. The starting state is configured to indicate displaying the control widget in the lock screen, and the hiding state is configured to indicate not displaying the control widget in the lock screen. For example, as shown in FIG. 4, when the user sets the display attribute setting option of the TV as "on" in the attribute setting interface, the display attribute of the control widget corresponding to the TV is the starting state. In contrast, when the user sets the display attribute setting option of the TV as "off" in the attribute setting interface, the display attribute of the control widget corresponding to the TV is the hiding state.

When the display attribute of the control widget indicates displaying in the lock screen, steps 304 and 305 of displaying the control widget in the lock screen are executed.

In step 304, when the display attribute indicates displaying in the lock screen, a device identification list is displayed in the lock screen, in which the device identification list includes an identification of the at least one device.

Figure 5:
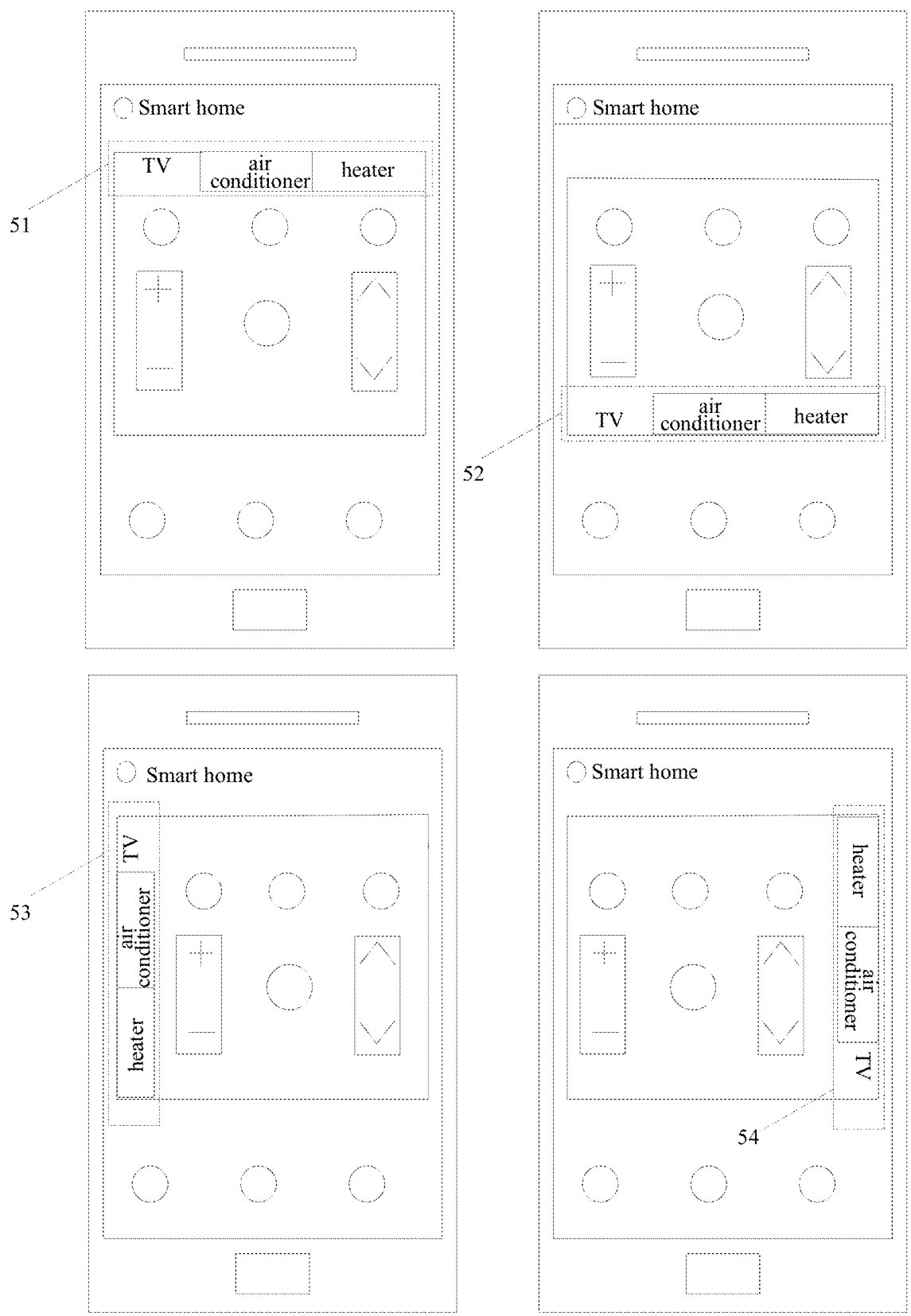
FIG. 5 is a schematic interface diagram of a device identification list display based on an embodiment shown in FIG. 3.

In one possible implementation, the device identification list is displayed in the lock screen in a form of tabs, and reference may be made to FIG. 5, which is a schematic interface diagram of displaying a device identification list based on the embodiment shown in FIG. 3. The device identification list is displayed in the lock screen in the form of tabs arranged in the horizontal direction, for example, disposed on the upper part 51 of the lock screen and on the middle-lower part 52 of the lock screen. The device identification list may also be displayed in the lock screen in the form of tabs arranged in the vertical direction, for example, disposed on the left part 53 of the lock screen and on the right part 54 of the lock screen.

Figure 6:
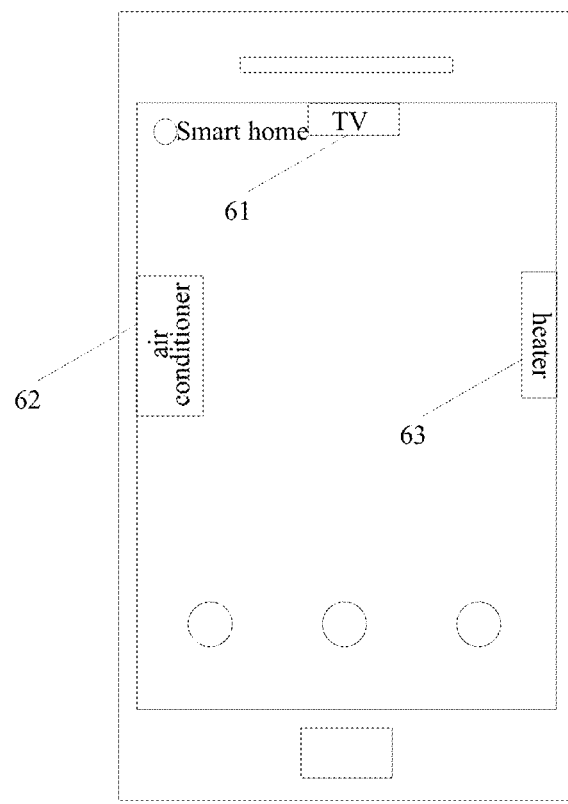
FIG. 6 is a schematic interface diagram of another device identification list display based on an embodiment shown in FIG. 3.

Besides being displayed in the form of tabs as shown in FIG. 5, the device identification list may also be displayed in the form of scattered tags. Referring to FIG. 6, which is a schematic interface diagram of displaying another device identification list based on the embodiment shown in FIG. 3, respective device identifications in the device identification list are displayed at edges closely next to the periphery of the lock screen in the form of tags, for example, at the locations where the device identification 61, the device identification 62 and the device identification 63 are, as shown in FIG. 6. It should be noted that, the locations where the device identification 61, the device identification 62 and the device identification 63 are in FIG. 6 are merely possible locations of the device identifications, but not configured to exclude other locations closely next to the periphery of the lock screen.

In step 305, when a selection operation on the identification of the at least one device is detected, a control panel of the at least one device is displayed at a specified location in the lock screen, in which the control panel includes the control widget.

The selection operation on the identification of the at least one device may be clicking, dragging and pressing. When the clicking or dragging operation on the identification of the at least one device is detected, the control panel of the at least one device is displayed at the specified location in the lock screen. When it is determined that the clicking or dragging operation on the identification of the at least one device is detected, the control panel of the at least one device may be displayed at the specified location with various animation effects. Alternatively, the pressing operation may be light pressing or heavy pressing. The control panel of the at least one device is displayed in a preview mode when the identification of the at least one device is lightly pressed. The lock screen quits the preview mode and recovers to the interface before the light pressing operation, when the operation on the identification of the at least one device switches to a touch-free state (no touch operation on the identification) from the light pressing state. The lock screen switches to the control panel of the at least one device displayed in the preview mode, when the operation on the identification of the at least one device switches to the heavy pressing state from the light pressing state. Under the heavy pressing state, the interface directly switches to the control panel of the at least one device for displaying.

In step 306, when the trigger operation on the control widget is detected, the control instruction corresponding to the control widget is determined.

When the main control device detects the trigger operation on the control widget, the control instruction corresponding to the control widget is determined at the main control device side according to the correspondence between the button clicked by the trigger operation and the control instruction.

Figure 7:
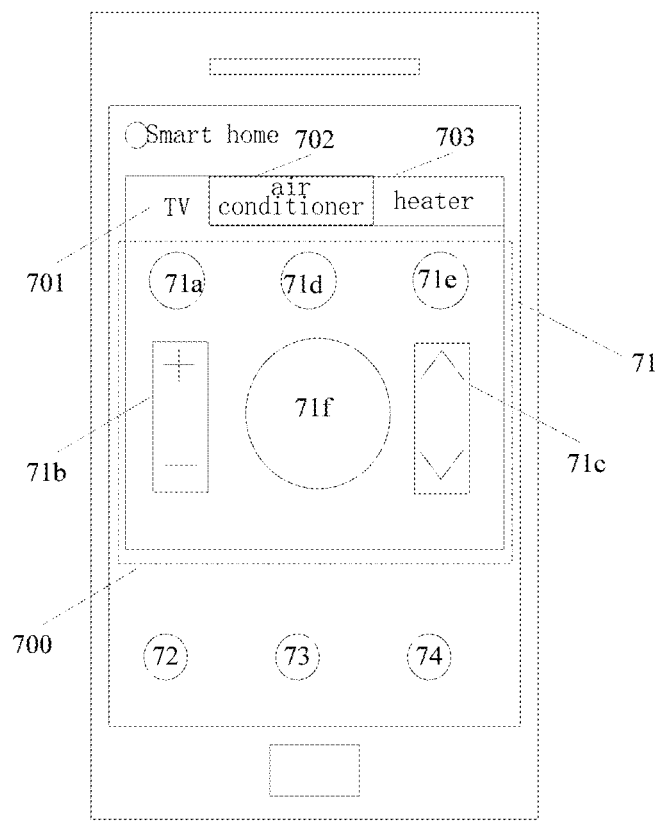
FIG. 7 is a schematic diagram of a lock screen based on an embodiment shown in FIG. 3.

FIG. 7 is a schematic diagram of a lock screen based on the embodiment shown in FIG. 3. As shown in FIG. 7, there are identifications 701, 702, and 703 of the at least one devices as well as the control panel 71 corresponding to the identification 701 of the at least one device in the lock screen 700, and the control panel 701 includes the switch button 71a, the first adjustment button 71b, the second adjustment button 71c, the first predetermined button 71d, the second predetermined button 71e and the third predetermined button 71f The identification 702 may include multiple sub-identifications correspond to multiple air conditioners when there are multiple air conditioners in the smart home system. When buttons 71a-71f in the control panel 71 are triggered by the user's operation, the main control device generates a single control instruction with respect to a certain at least one device. After the smart scene 71, the smart scene 72, the smart scene 73 are started by the trigger operation of the user, the device corresponding to the smart scene starts to work according to the predetermined working mode of the smart scene.

Figure 8:
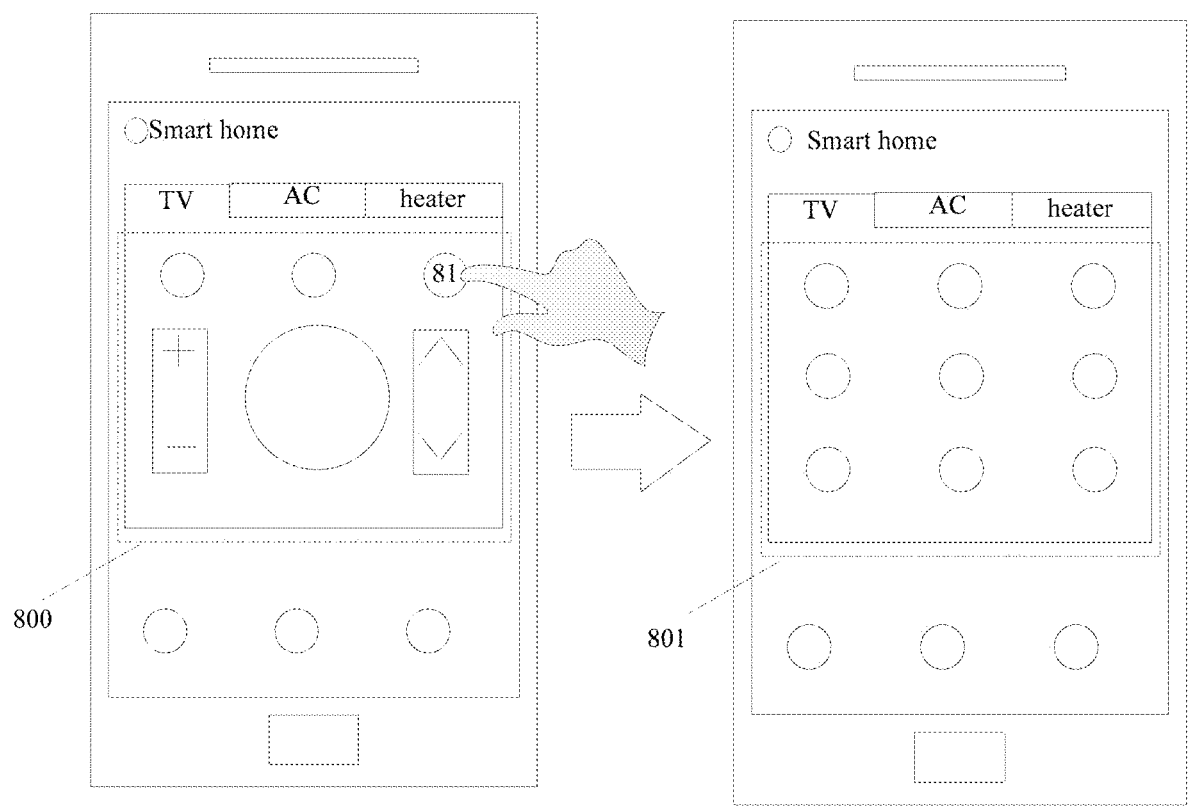
FIG. 8 is a schematic diagram showing switching a control panel of at least one device based on an embodiment shown in FIG. 3.

It should be noted that, the number of buttons displayed in the control panel is limited due to the size of the lock screen, and thus only buttons commonly used for controlling the at least one device are displayed, or one predetermined button is displayed and if this button is clicked, an interface including a plurality of other predetermined buttons is switched to, as shown in FIG. 8, which is a schematic diagram showing switching a control panel of the at least one device based on the embodiment shown in FIG. 3. In FIG. 8, when the selection operation on the function button 81 in the first control panel 800 of the at least one device is detected, the lock screen switches to the interface of displaying the second control panel 801. The second control panel of the at least one device is set, such that buttons which cannot be placed in the first control panel due to the limited plane space can be placed.

When the situation in step 306 is satisfied, step 307 is executed.

In step 307, the control instruction is sent to the at least one device, in which the control instruction is configured to instruct the at least one device to execute the predetermined operation corresponding to the control instruction.

The main control device sends the control instruction to the at least one device, and the at least one device executes the predetermined operation in the control instruction after receiving the control instruction.

In one possible implementation, when the control widget on which the trigger operation is performed on is the first control widget for controlling at least one device, the main control device may send the control instruction as follows, for controlling the at least one device to execute related operations. For example, after the control widget of next channel in the control panel corresponding to the tag "TV" of the at least one device in the lock screen is clicked, the main control device obtains the control instruction according to the tag of the at least one device and the control widget in the corresponding control panel. Then, the main control device sends the control instruction to the TV, and the TV changes to the next channel according to the control instruction after receiving the control instruction.

In another possible implementation, when the control widget on which the trigger operation is performed on is the second control widget for controlling a smart scene, the main control device may send the control instruction as follows, for controlling the at least one device in the smart scene to execute related operations. For example, after the smart scene corresponding to the tag "go home mode" of the at least one device in the lock screen is started by clicking, the main control device generates a smart scene starting instruction. The smart scene starting instruction may be directly sent to respective smart devices in the smart scene, or may be sent to a control device for controlling the smart scene, which then sends the starting instruction to respective smart devices for instructing respective smart devices to work according to the working mode set for the smart scene, in which the control device for controlling the smart scene may be a home gateway, a router or a cloud server.

In conclusion, with the method for controlling the device provided by this embodiment, the display attributes of the control widget are set by displaying the attribute setting interface, and then the display attributes of the control widget are obtained, the device identification list including the identification of the at least one device is displayed in the lock screen, the control panel (including the control widget) of the at least one device is displayed at the specified location in the lock screen if the selection operation on the identification of the at least one device is detected, the control instruction corresponding to the control widget is determined if the trigger operation on the control widget is detected, and the control instruction is sent to the at least one device for instructing the at least one device to execute the predetermined operation corresponding to the control instruction. In this way, the user may control the at least one device to execute related operations rapidly via the control widget on the lock screen of the main control device, without unlocking the main control device and without entering into an application for controlling devices, thus simplifying the operation steps of controlling the at least one device via the main control device with locked screen.

Figure 9:
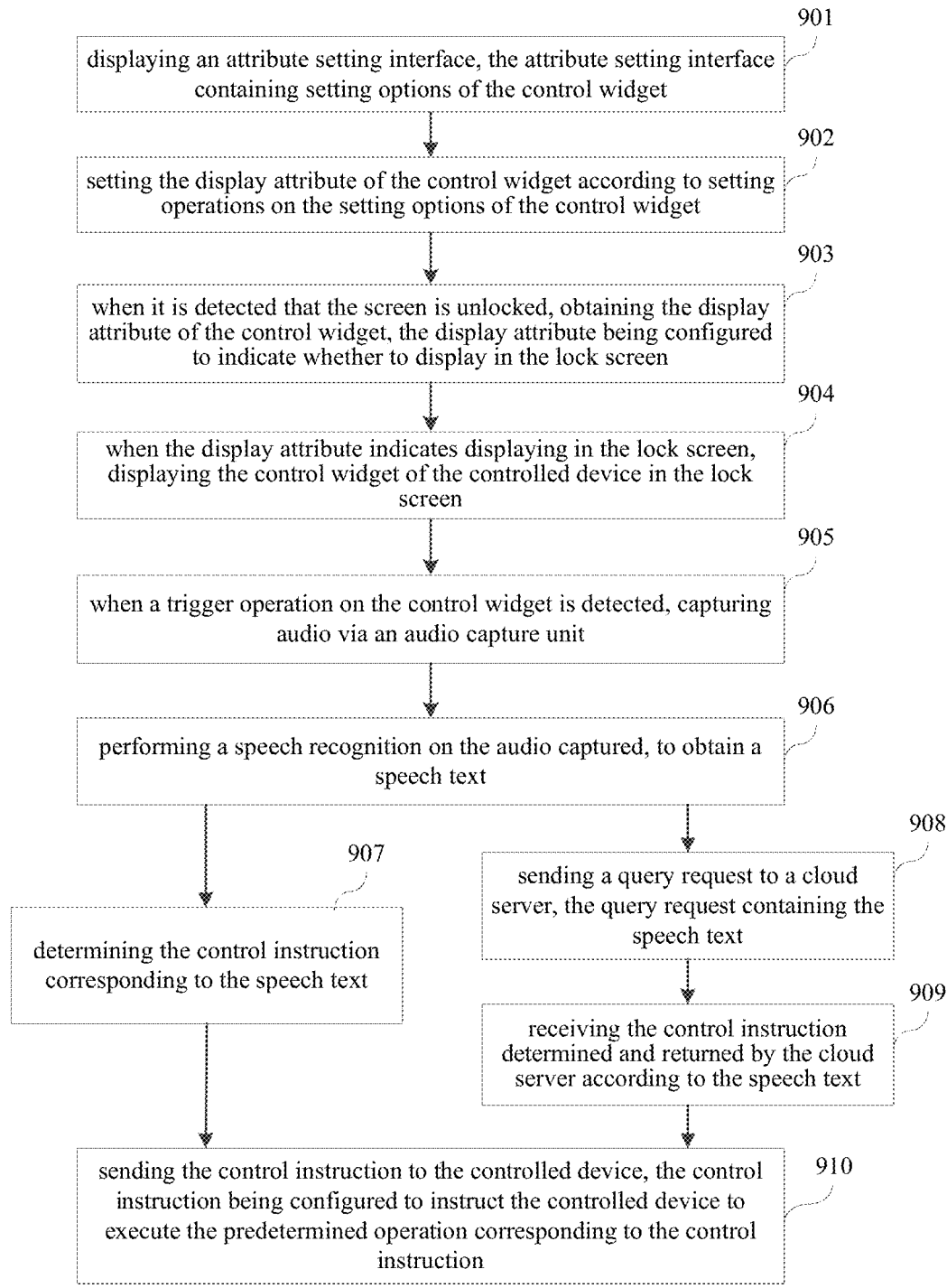
FIG. 9 is a flow chart of a method for controlling a device according to yet another exemplary embodiment.

FIG. 9 is a flow chart of a method for controlling a device according to yet another embodiment of the present disclosure. The method may be executed by the main control device 110 in the implementation environment shown in FIG. 1, and may include following steps.

In step 901, an attribute display interface is displayed, in which the attribute display interface includes setting options of the control widget.

Figure 10:
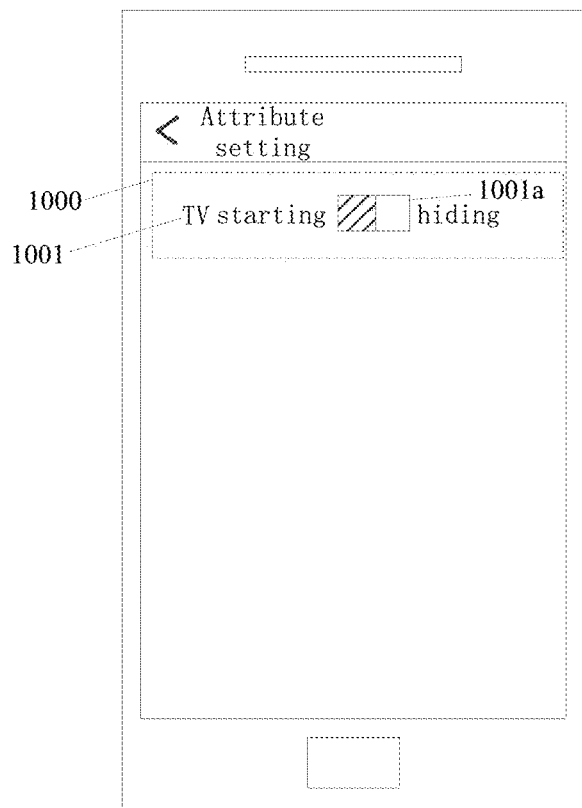
FIG. 10 is a schematic interface diagram of an attribute setting interface based on an embodiment shown in FIG. 9.

FIG. 10 is schematic interface diagram of an attribute display interface based on the embodiment shown in FIG. 9. As shown in FIG. 10, for the setting item 1001 shown in the attribute display interface 1000, the setting item 1001 is configured to set whether the display attribute 1001a of the speech control widget is hiding or starting.

In step 902, the display attribute of the control widget is set according to setting operations on the setting options of the control widget.

Based on the example shown in step 901, in this step, the display attribute of the speech control widget is determined as starting, or in this step, the display attribute of the speech control widget is determined as closing.

In step 903, if it is detected that the screen is unlocked, the display attribute of the control widget is obtained, in which the display attribute is configured to indicate whether to display the control widget of the at least one device in the lock screen.

In step 904, if the display attribute indicates displaying in the lock screen, the control widget of the at least one device is displayed in the lock screen.

Similar to the embodiment as shown in FIG. 3, in this step, the device identification list may be first displayed in the lock screen, the device identification list including the identification of the at least one device, and then if the selection operation on the identification of the at least one device is detected, the control panel of the at least one device is displayed at the specified location in the lock screen, the control panel including the control widget.

In step 905, if the trigger operation on the control widget is detected, audio is captured via the audio capture unit.

Figure 11:
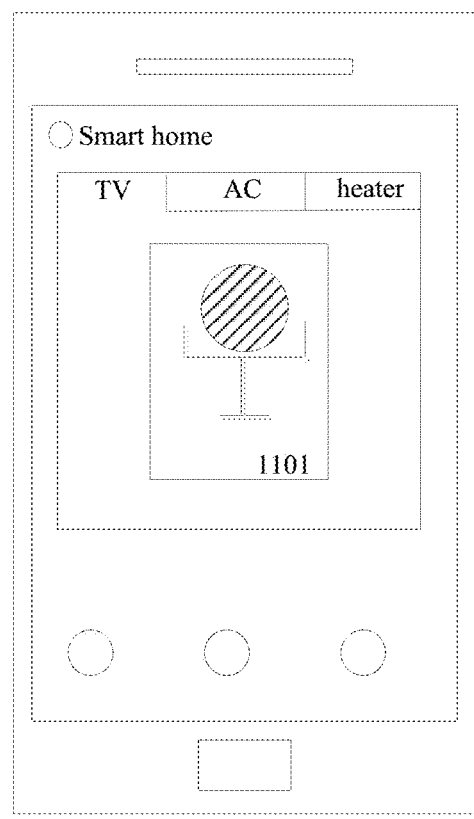
FIG. 11 is a schematic interface diagram of displaying a speech control widget based on an embodiment shown in FIG. 9.

FIG. 11 is a schematic interface diagram of displaying a speech control widget based on the embodiment shown in FIG. 9. Referring to FIG. 11, in the interface shown in FIG. 11, capturing audio via the audio capture unit is started if the speech control widget 1101 is long-pressed or clicked. Alternatively, the audio capture unit is integrated in the main control device.

In step 906, speech recognition is performed on the audio captured, to obtain the speech text.

The main control device performs the speech recognition on the audio captured, to recognize the speech as the speech text, in which the speech text is language-related text information.

After step 906 is executed, step 907 and step 910 are executed, or steps 908 to 910 are executed.

In step 907, the control instruction corresponding to the speech text is determined.

The device executing step 907 is at the main control device side. The main control device searches for the control instruction corresponding to the speech text according to the correspondence table stored in local.

In step 908, a query request is sent to the cloud server, in which the query request includes the speech text.

In this step, the main control device sends the recognized speech text to the cloud server.

The cloud server is configured to query the control instruction corresponding to the speech text according to the correspondence table stored in server.

In step 909, the control instruction determined and returned by the cloud server according to the speech text is received.

The main control device receives the control instruction determined and returned by the cloud server according to the speech text.

Alternatively, the work executed by the cloud server in steps 908 and 909 may be done by the home gateway, the router, the LAN host or the workstation.

In step 910, the control instruction is sent to the at least one device, in which the control instruction is configured to instruct the at least one device to execute the predetermined operation corresponding to the control instruction.

The main control device sends the control instruction to the at least one device, and the at least one device executes the predetermined operation in the control instruction after receiving the control instruction.

In one possible implementation, when the control instruction obtained by the main control device is corresponding to controlling at least one device, the main control device sends the control instruction as follows, for controlling the at least one device to execute related operations. For example, after the speech control widget in the lock screen is triggered by clicking operation, the main control device receives the user's speech "turn on TV" and obtains the control instruction corresponding to the speech. Then, the main control device sends the control instruction to the TV, and the TV is turned on after the TV receives the control instruction.

In another possible implementation, when the control instruction obtained by the main control device is corresponding to controlling a smart scene, the main control device sends the control instruction as follows, for controlling the control device in the smart scene to execute related operations. For example, after the speech control widget in the lock screen is triggered by clicking operation, the main control device receives the user's speech "start go home mode" and receives the control instruction corresponding to the speech. Then, the main control device sends the starting instruction to the home gateway for starting the "go home mode", and then the home gateway sends the starting instruction to respective smart devices in the smart scene; or, the main control device directly sends the starting instruction to respective smart devices in the smart scene, for instructing respective smart devices to work according to the working mode set for the "go home mode".

In conclusion, with the method for controlling a device provided by this embodiment, the display attribute of the control widget is set by displaying the attribute setting interface, and then the display attribute of the control widget is obtained, the speech control widget of the at least one device is displayed in the lock screen, the audio is captured via the audio capture unit if the trigger operation on the control widget is detected, the speech text is obtained by performing the speech recognition on the audio captured, and the control instruction corresponding to the speech text is determined and sent to the at least one device, for instructing the at least one device to execute the predetermined operation corresponding to the control instruction. In this way, the user may control the at least one device to execute related operations rapidly via the control widget on the lock screen of the main control device, without unlocking the main control device and without entering into an application for controlling devices, thus simplifying the operation steps of controlling the at least one device via the main control device with locked screen.

Figure 12:
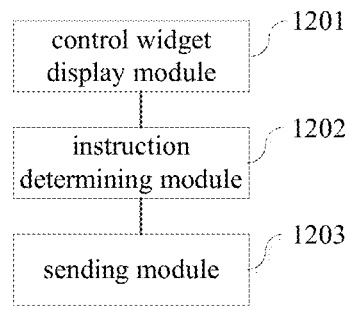
FIG. 12 is a block diagram of an apparatus for controlling a device according to an exemplary embodiment.

FIG. 12 is a block diagram of an apparatus for controlling a device according to an exemplary embodiment. The apparatus may be configured as a whole or a part of the main control device in the form of hardware circuits or a combination of hardware and software, and implement the method for controlling a device as shown in FIG. 2, 3 or 9. The apparatus may include a control widget display module 1201, an instruction determining module 1202 and a sending module 1203.

The control widget display module 1201 is configured to display a control widget corresponding to the at least one device in a lock screen.

The instruction determining module 1202 is configured to determine a control instruction corresponding to the control widget if a trigger operation on the control widget is detected.

The sending module 1203 is configured to send the control instruction to the at least one device, in which the control instruction is configured to instruct the at least one device to execute a predetermined operation corresponding to the control instruction.

In conclusion, with the apparatus for controlling a device provided by embodiments of the present disclosure, the control widget corresponding to the at least one device is displayed in the lock screen, and if the trigger operation on the control widget is detected, the control instruction corresponding to the control widget is determined and sent to the at least one device, in which the control instruction is configured to instruct the at least one device to execute the predetermined operation corresponding to the control instruction. In this way, the user may control the at least one device to execute related operations rapidly via the control widget on the lock screen of a main control device, without unlocking the main control device and without entering into an application for controlling devices, thus simplifying the operation steps of controlling the at least one device via the main control device with locked screen.

Figure 13:
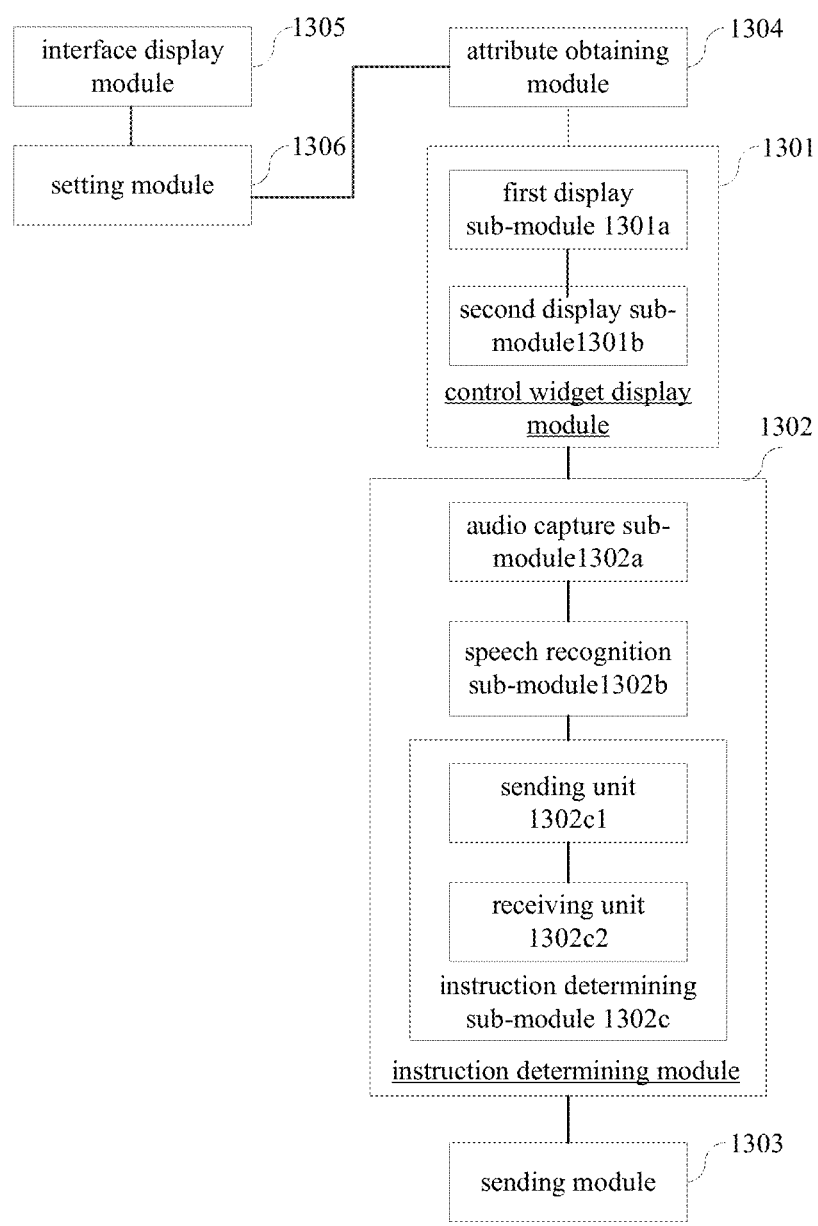
FIG. 13 is a block diagram of an apparatus for controlling a device according to another exemplary embodiment.

FIG. 13 is a block diagram of an apparatus for controlling a device according to another embodiment of the present disclosure. The apparatus may be a whole or a part of the main control device in the form of hardware circuits or a combination of hardware and software, and implement the method for controlling a device as shown in FIG. 2, 3 or 9. The apparatus may include a control widget display module 1301, an instruction determining module 1302, a sending module 1303, an attribute obtaining module 1304, an interface display module 1305, and a setting module 1306.

The control widget display module 1301 is configured to display a control widget corresponding to the at least one device in a lock screen.

The instruction determining module 1302 is configured to determine a control instruction corresponding to the control widget if a trigger operation on the control widget is detected.

The sending module 1303 is configured to send the control instruction to the at least one device, in which the control instruction is configured to instruct the at least one device to execute a predetermined operation corresponding to the control instruction.

The control widget display module 1301 includes a first display sub-module 1301*a* and a second display sub-module 1301*b*.

The first display sub-module 1301*a* is configured to display a device identification list in the lock screen, in which the device identification list includes an identification of the at least one device.

The second display sub-module 1301*b* is configured to display a control panel of the at least one device at a specified position in the lock screen, if a selection operation on the identification of the at least one device is detected, in which the control panel includes the control widget.

The attribute obtaining module 1304 is configured to obtain a display attribute of the control widget before the control widget display module 1301 displays the control widget corresponding to the at least one device in the lock screen, in which the display attribute is configured to indicate whether to display in the lock screen.

The control widget display module 1301 is configured to display the control widget corresponding to the at least one device in the lock screen, if the display attribute indicates displaying in the lock screen.

The interface display module 1305 is configured to display an attribute setting interface before the display attribute of the control widget is obtained, in which the attribute setting interface includes setting options of the control widget.

The setting module 1306 is configured to set the display attribute of the control widget according to setting operations on the setting options of the control widget.

The instruction determining module 1302 includes an audio capture sub-module 1302*a*, a speech recognition sub-module 1302*b* and an instruction determining sub-module 1302*c*.

The audio capture sub-module 1302*a* is configured to capture audio via an audio capture unit, if the trigger operation on the control widget is detected.

The speech recognition sub-module 1302*b* is configured to perform a speech recognition on the audio captured to obtain a speech text.

The instruction determining sub-module 1302*c* is configured to determine the control instruction corresponding to the speech text.

The instruction determining sub-module 1302*c* further includes a sending unit 1302*c*1 and a receiving unit 1302*c*2.

The sending unit 1302*c*1 is configured to send a query request to a cloud server, the query request including the speech text.

The receiving unit 1302*c*2 is configured to receive the control instruction determined and returned by the cloud server according to the speech text.

In conclusion, with the apparatus for controlling a device provided by embodiments of the present disclosure, the control widget corresponding to the at least one device is displayed in the lock screen, and if the trigger operation on the control widget is detected, the control instruction corresponding to the control widget is determined and sent to the at least one device, in which the control instruction is configured to instruct the at least one device to execute the predetermined operation corresponding to the control instruction. In this way, the user may rapidly control the at least one device to execute related operations via the control widget on the lock screen of a main control device, without unlocking the main control device and without entering into an application for controlling devices, thus simplifying the operation steps of controlling the at least one device via the main control device with locked screen.

The present disclosure further provides an apparatus for controlling a device, which includes a processor and a memory configured to store instructions executable by the processor. The processor is configured to:

display a control widget corresponding to at least one device in a lock screen;

determine a control instruction corresponding to the control widget, if a trigger operation on the control widget is detected; and send the control instruction to the at least one device, in which the control instruction is configured to instruct the at least one device to execute a predetermined operation corresponding to the control instruction.

Alternatively, displaying a control widget corresponding to the at least one device in a lock screen includes:

displaying a device identification list in the lock screen, in which the device identification list includes an identification of the at least one device;

when a selection operation on the identification of the at least one device is detected, displaying a control panel of the at least one device at a specified position in the lock screen, in which the control panel includes the control widget.

Alternatively, the method further includes:

obtaining a display attribute of the control widget before displaying the control widget corresponding to the at least one device in the lock screen, in which the display attribute is configured to indicate whether to display in the lock screen; and displaying the control widget corresponding to the at least one device in the lock screen, if the display attribute indicates displaying in the lock screen.

Alternatively, the method further includes:

displaying an attribute setting interface before obtaining the display attribute of the control widget, in which the attribute setting interface includes setting options of the control widget;

setting the display attribute of the control widget according to setting operations on the setting options of the control widget.

Alternatively, determining a control instruction corresponding to the control widget when a trigger operation on the control widget is detected includes:

when the trigger operation on the control widget is detected, capturing audio via an audio capture unit;

performing a speech recognition on the audio captured to obtain a speech text;

determining the control instruction corresponding to the speech text.

Alternatively, determining the control widget corresponding to the speech text includes:

sending a query request to a cloud server, the query request comprising the speech text; and receiving the control instruction determined and returned by the cloud server according to the speech text.

It should be noted that, for the sake of clarity, the apparatus provided by above embodiments are divided into respective function modules for implementing the functions of the apparatus. In practice use, the above functions may be allocated to different function modules according to actual demands, that is, the content structure of the apparatus is divided into respective function modules, for implementing all or a part of functions described above.

With respect to the apparatus in above embodiments, the specific implementations of respective modules have already been described in embodiments regarding methods, which will not be elaborated herein.

Figure 14:
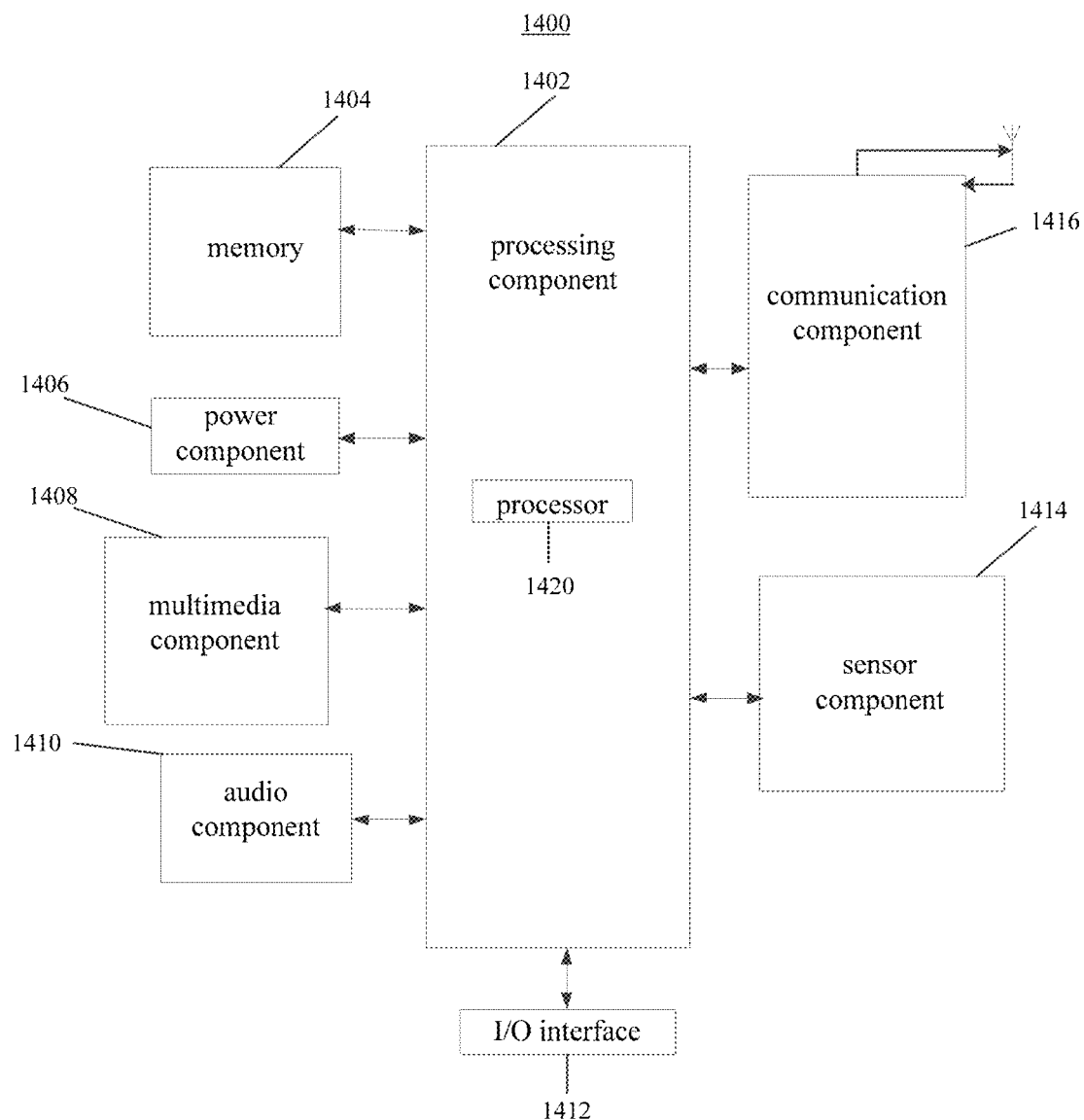
FIG. 14 is a block diagram of another apparatus according to an exemplary embodiment.

FIG. 14 is a block diagram of a device 1400 according to an exemplary embodiment. For example, the device 1400 may be a controlled device, for example, a smart phone, a wearable device, a smart TV and a vehicle terminal.

Referring to FIG. 14, the device 1400 may include the following one or more components: a processing component 1402, a memory 1404, a power component 1406, a multimedia component 1408, an audio component 1410, an Input/Output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 808 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1408 includes a front camera and/or a rear camera. The front camera and the rear camera may receive external multimedia data while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface for the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400 and relative positioning of components (e.g., the display and the keypad of the device 1400). The sensor component 1414 may also detect a change in position of the device 1400 or of a component in the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate wired or wireless communication between the device 1400 and other devices. The device 1400 can access a wireless network based on a communication standard, such as WIFI, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit in the disclosure may be implemented at least partially using the one or more circuitries.

In exemplary embodiments, there is also provided a non-transitory computer readable storage medium including instructions, such as the memory 1404 including instructions. The above instructions are executable by the processor 1420 in the device 1400, for performing the above-described methods. For example, the non-transitory computer-readable storage medium may be a ROM, a RAM, a CD-ROM, a magnetic tape, a floppy disc, an optical data storage device, and the like. Further, each module or sub-module may include non-transitory memory (shared, dedicated, or group) that stores code or instructions that can be executed by one or more processors. The module or sub-module may take the form of a packaged functional hardware unit designed for use with other components, a portion of a program code (e.g., software or firmware) executable by the processing component 1202, one or more circuitries that usually perform a particular function of related functions, or a self-contained hardware or software component that interfaces with a larger system, for example.

The present disclosure also provides a non-transitory computer readable storage medium including instructions that, when executed by the processor of the device 1400, cause the device 1400 to execute the above method for controlling a device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method, comprising:
    displaying, by an electronic device comprising a touch screen, a control widget corresponding to at least one device in a lock screen on the touch screen;
    wherein the electronic device is connected to the at least one device via a wireless network, and is configured to control the at least one device via the control widget corresponding to the at least one device;
    determining, by the electronic device, a control instruction corresponding to the control widget, when the electronic device detects a trigger operation on the control widget; and
    sending, by the electronic device, the control instruction to the at least one device, wherein the control instruction instructs the at least one device to execute a predetermined operation corresponding to the control instruction,
    the method further comprising:
        displaying an attribute setting interface comprising setting options of the control widget, the setting options comprising a smart display attribute setting option and an animation display attribute setting option;

setting a display attribute of the control widget according to setting operations on the setting options of the control widget;

obtaining the display attribute of the control widget before displaying the control widget corresponding to the at least one device in the lock screen, wherein the display attribute is configured to indicate whether to display in the lock screen;

displaying the control widget corresponding to the at least one device in the lock screen, when the display attribute indicates displaying in the lock screen;

when the smart display attribute setting option is starting, determining whether the control widget is displayed in the lock screen according to how far the distance between the electronic device and the at least one device is; wherein when the distance between the electronic device and the at least one device is less than or equal to a predetermined threshold, it is determined to display the control widget corresponding to the at least one device in the lock screen, such that the electronic device controls the at least one device via the displayed control widget corresponding to the at least one device in the lock screen, and when the distance between the electronic device and the at least one device is greater than the predetermined threshold, it is determined not to display the control widget corresponding to the at least one device in the lock screen, such that the electronic device cannot control the at least one device; and when the animation display attribute setting option is starting, determining words displayed on the control widget in the lock screen is displayed according to predetermined animation display form.

2. The method according to claim 1, wherein displaying a control widget corresponding to the at least one device in a lock screen comprises:

displaying a device identification list in the lock screen, in which the device identification list comprises an identification of the at least one device; and when a selection operation on the identification of the at least one device is detected, displaying a control panel of the at least one device at a specified position in the lock screen, in which the control panel comprises the control widget.

3. The method according to claim 1, wherein determining the control instruction corresponding to the control widget when the trigger operation on the control widget is detected comprises:

when the trigger operation on the control widget is detected, capturing audio via an audio capture unit;

performing a speech recognition on the audio to obtain a speech text; and determining the control instruction corresponding to the speech text.

4. The method according to claim 3, wherein determining the control widget corresponding to the speech text comprises:

sending a query request to a cloud server, the query request comprising the speech text; and receiving the control instruction determined and returned by the cloud server according to the speech text.

5. An apparatus for controlling a device, comprising:
one or more processors; and non-transitory computer-readable memory, configured to store instructions executable by the one or more processors, wherein the one or more processors are configured to:

display a control widget corresponding to at least one device in a lock screen, wherein the apparatus for controlling the device is connected to the at least one device via a wireless network, and is configured to control the at least one device via the control widget corresponding to the at least one device;

determine a control instruction corresponding to the control widget, when a trigger operation on the control widget is detected; and send the control instruction to the at least one device, in which the control instruction is configured to instruct the at least one device to execute a predetermined operation corresponding to the control instruction, wherein the processor is further configured to:

display an attribute setting interface comprising setting options of the control widget, the setting options comprising a smart display attribute setting option and an animation display attribute setting option;

set a display attribute of the control widget according to setting operations on the setting options of the control widget;

obtain the display attribute of the control widget before displaying the control widget corresponding to the at least one device in the lock screen, wherein the display attribute is configured to indicate whether to display in the lock screen;

display the control widget corresponding to the at least one device in the lock screen, when the display attribute indicates displaying in the lock screen;

when the smart display attribute setting option is starting, determine whether the control widget is displayed in the lock screen according to how far the distance between the electronic device and the at least one device is, wherein when the distance between the apparatus and the at least one device is less than or equal to a predetermined threshold, it is determined to display the control widget corresponding to the at least one device in the lock screen, such that the apparatus controls the at least one device via the displayed control widget corresponding to the at least one device in the lock screen, and when the distance between the apparatus and the at least one device is greater than the predetermined threshold, it is determined not to display the control widget corresponding to the at least one device in the lock screen, such that the apparatus cannot control the at least one device; and when the animation display attribute setting option is starting, determining words displayed on the control widget in the lock screen is displayed according to predetermined animation display form.

6. The apparatus according to claim 5, wherein the one or more processors are further configured to:

display a device identification list in the lock screen, in which the device identification list comprises an identification of the at least one device; and display a control panel of the at least one device at a specified position in the lock screen, when a selection operation on the identification of the at least one device is detected, in which the control panel comprises the control widget.

7. The apparatus according to claim 5, wherein the one or more processors are further configured to:

capture audio via an audio capture unit, when the trigger operation on the control widget is detected;
perform a speech recognition on the audio to obtain a speech text; and
determine the control instruction corresponding to the speech text.

8. The apparatus according to claim 7, wherein the one or more processors are further configured to:
send a query request to a cloud server, the query request comprising the speech text; and
receive the control instruction determined and returned by the cloud server according to the speech text.

9. A non-transitory computer readable storage medium, having stored therein instructions that, when executed by an electronic device comprising one or more processors and a touch screen, causing the electronic device to execute acts comprising:
displaying a control widget corresponding to at least one device in a lock screen, wherein the electronic device is connected to the at least one device via a wireless network, and is configured to control the at least one device via the control widget corresponding to the at least one device;
determining a control instruction corresponding to the control widget, when a trigger operation on the control widget is detected; and
sending the control instruction to the at least one device, wherein the control instruction is configured to instruct the at least one device to execute a predetermined operation corresponding to the control instruction,
the acts further comprising:
displaying an attribute setting interface comprising setting options of the control widget, the setting options comprising a smart display attribute setting option and an animation display attribute setting option;
setting a display attribute of the control widget according to setting operations on the setting options of the control widget;
obtaining the display attribute of the control widget before displaying the control widget corresponding to the at least one device in the lock screen, wherein the display attribute is configured to indicate whether to display in the lock screen;
displaying the control widget corresponding to the at least one device in the lock screen, when the display attribute indicates displaying in the lock screen;
when the smart display attribute setting option is starting, determining whether the control widget is displayed in the lock screen according to how far the distance between the electronic device and the at least one device is, wherein when the distance between the electronic device and the at least one device is less than or equal to a predetermined threshold, it is determined to display the control widget corresponding to the at least one device in the lock screen, such that the electronic device controls the at least one device via the displayed control widget corresponding to the at least one device in the lock screen, and when the distance between the electronic device and the at least one device is greater than the predetermined threshold, it is determined not to display the control widget corresponding to the at least one device in the lock screen, such that the electronic device cannot control the at least one device; and
when the animation display attribute setting option is starting, determining words displayed on the control widget in the lock screen is displayed according to predetermined animation display form.

10. The non-transitory computer readable storage medium according to claim 9, wherein displaying a control widget corresponding to the at least one device in a lock screen comprises:
displaying a device identification list in the lock screen, in which the device identification list comprises an identification of the at least one device; and
when a selection operation on the identification of the at least one device is detected, displaying a control panel of the at least one device at a specified position in the lock screen, in which the control panel comprises the control widget.

11. The non-transitory computer readable storage medium according to claim 9, wherein determining the control instruction corresponding to the control widget when the trigger operation on the control widget is detected comprises:
when the trigger operation on the control widget is detected, capturing audio via an audio capture unit;
performing a speech recognition on the audio to obtain a speech text; and
determining the control instruction corresponding to the speech text.

12. The non-transitory computer readable storage medium according to claim 11, wherein determining the control widget corresponding to the speech text comprises:
sending a query request to a cloud server, the query request comprising the speech text; and
receiving the control instruction determined and returned by the cloud server according to the speech text.

* * * * *